US012065108B2

(12) United States Patent
Srinivas et al.

(10) Patent No.: US 12,065,108 B2
(45) Date of Patent: Aug. 20, 2024

(54) WIPER COMPOSITE BEAM BLADE ASSEMBLY WITH WASH TUBE INTEGRATION

(71) Applicant: Rosemount Aerospace Inc., Burnsville, MN (US)

(72) Inventors: Nouduri Phani Srinivas, Bangalore (IN); Murugan Kuppuswamy, Bangalore (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 0 days.

(21) Appl. No.: 17/937,941

(22) Filed: Oct. 4, 2022

(65) Prior Publication Data
US 2023/0114006 A1   Apr. 13, 2023

(30) Foreign Application Priority Data
Oct. 9, 2021   (IN) .............................. 202141046063

(51) Int. Cl.
*B60S 1/52* (2006.01)
*B60S 1/34* (2006.01)
*B60S 1/38* (2006.01)

(52) U.S. Cl.
CPC ............. *B60S 1/524* (2013.01); *B60S 1/3415* (2013.01); *B60S 1/3848* (2013.01); *B60S 1/3862* (2013.01); *B60S 2001/3812* (2013.01)

(58) Field of Classification Search
CPC ...... B60S 1/3808; B60S 1/381; B60S 1/3415; B60S 1/524; B60S 1/3862; B60S 1/3848; B60S 1/3875; B60S 2001/3812
USPC ............ 15/250.02, 250.04, 250.451, 250.43, 15/250.44
See application file for complete search history.

(56) References Cited

U.S. PATENT DOCUMENTS

| 2,910,715 A | | 11/1959 | Ohrt |
| 3,418,676 A | | 12/1968 | Ernest et al. |
| 3,757,379 A | * | 9/1973 | Benson .................. B60S 1/524 15/250.04 |
| 3,854,161 A | | 12/1974 | Benson |
| 4,123,817 A | | 11/1978 | Hartery |
| 4,517,704 A | * | 5/1985 | Benson .................. B60S 1/524 15/250.04 |

(Continued)

FOREIGN PATENT DOCUMENTS

| BR | PI0709139 A2 | 6/2011 |
| CN | 103707850 A | 4/2014 |

(Continued)

OTHER PUBLICATIONS

Machine translation of description portion of French publication 2648771, published Dec. 1990. (Year: 1990).*

(Continued)

*Primary Examiner* — Gary K. Graham
(74) *Attorney, Agent, or Firm* — Kinney & Lange, P. A.

(57) ABSTRACT

An aircraft windshield wiper system includes a wiper blade with a composite support member and a blade element that interfaces with the windshield of the aircraft to clear the windshield of rain and other debris. The composite support member includes a wash tube integral with the composite support member, such that the wash tube receives windshield washing fluid from a fluid reservoir and dispenses the fluid onto the windshield of the aircraft. A plurality of clips can be used to couple the composite support member to the blade element.

10 Claims, 6 Drawing Sheets

(56) References Cited

U.S. PATENT DOCUMENTS

| | | | |
|---|---|---|---|
| 5,383,247 A | 1/1995 | Nickel | |
| 5,842,251 A | 12/1998 | Lefrancois et al. | |
| 6,026,537 A * | 2/2000 | Hojnacki | B60S 1/3801 |
| | | | 15/250.44 |
| 6,253,411 B1 * | 7/2001 | Aichele | B29C 70/50 |
| | | | 15/250.43 |
| 6,766,553 B2 | 7/2004 | Wilson | |
| 7,165,287 B2 | 1/2007 | Buchanan | |
| 8,225,455 B1 | 7/2012 | Blus et al. | |
| 9,045,114 B2 | 6/2015 | Weber | |
| 9,963,116 B2 | 5/2018 | Barret et al. | |
| 10,759,390 B2 | 9/2020 | Rapp et al. | |
| 2006/0265830 A1 * | 11/2006 | Walworth | B60S 1/3877 |
| | | | 15/236.02 |
| 2016/0129890 A1 | 5/2016 | Thebault et al. | |
| 2022/0289145 A1 * | 9/2022 | Hitnalli | B60S 1/38 |

FOREIGN PATENT DOCUMENTS

| | | |
|---|---|---|
| DE | 10323998 A1 | 12/2004 |
| DE | 102015218682 A1 | 3/2017 |
| FR | 2648771 A1 | 12/1990 |

OTHER PUBLICATIONS

Extended European Search Report for EP Application No. 22200034.1, Dated Feb. 13, 2023, pp. 5.

Extended European Search Report for EP Application No. 22200277.6, Dated Feb. 13, 2023, pp. 6.

* cited by examiner

WIPER COMPOSITE BEAM BLADE ASSEMBLY WITH WASH TUBE INTEGRATION

CROSS-REFERENCE TO RELATED APPLICATION(S)

This application claims the benefit of India Provisional Application No. 202141046063 filed Oct. 9, 2021, for "WIPER COMPOSITE BEAM BLADE ASSEMBLY WITH WASH TUBE INTEGRATION" are hereby incorporated by reference in their entirety.

BACKGROUND

The present disclosure relates to windshield wiper systems, and in particular to a windshield wiper system used on an aircraft.

Aircraft windshield wiper systems are used to wipe and clean water or other debris from an aircraft windshield, allowing better visibility out the windshield for both the pilot and co-pilot. Windshield wiper systems include a wiper arm and a wiper blade that sweep back and forth across a windshield within specific sweep angle requirements, cleaning the windshield for the pilot and co-pilot. Many windshield wiper systems include a wash system that dispenses a fluid onto the windshield of the aircraft to aid in cleaning the windshield of the aircraft. Windshield wiper systems utilizing metallic supports have a fluid tube welded or brazed to the metallic components for providing fluid adjacent the wiper blade sweeping across the windshield. Windshield wiper systems utilizing composite supports cannot include welded or brazed fluid tubes and therefore there is a need for a solution to incorporate fluid tubes into composite support type wiper blade assemblies.

SUMMARY

According to one aspect of the disclosure, a wiper blade for use on a windshield of an aircraft is disclosed. The wiper blade includes a support member, a blade element, a clip, and a wash tube. The support member is coupled to the blade element, and the support member is constructed from a composite material. The clip is coupled to and surrounds at least a portion of the support member and at least a portion of the blade element. The wash tube is integral with the support member, and the wash tube is fluidly coupled to a plurality of nozzles spaced along a length of the wiper blade.

DETAILED DESCRIPTION

Figure 1A:
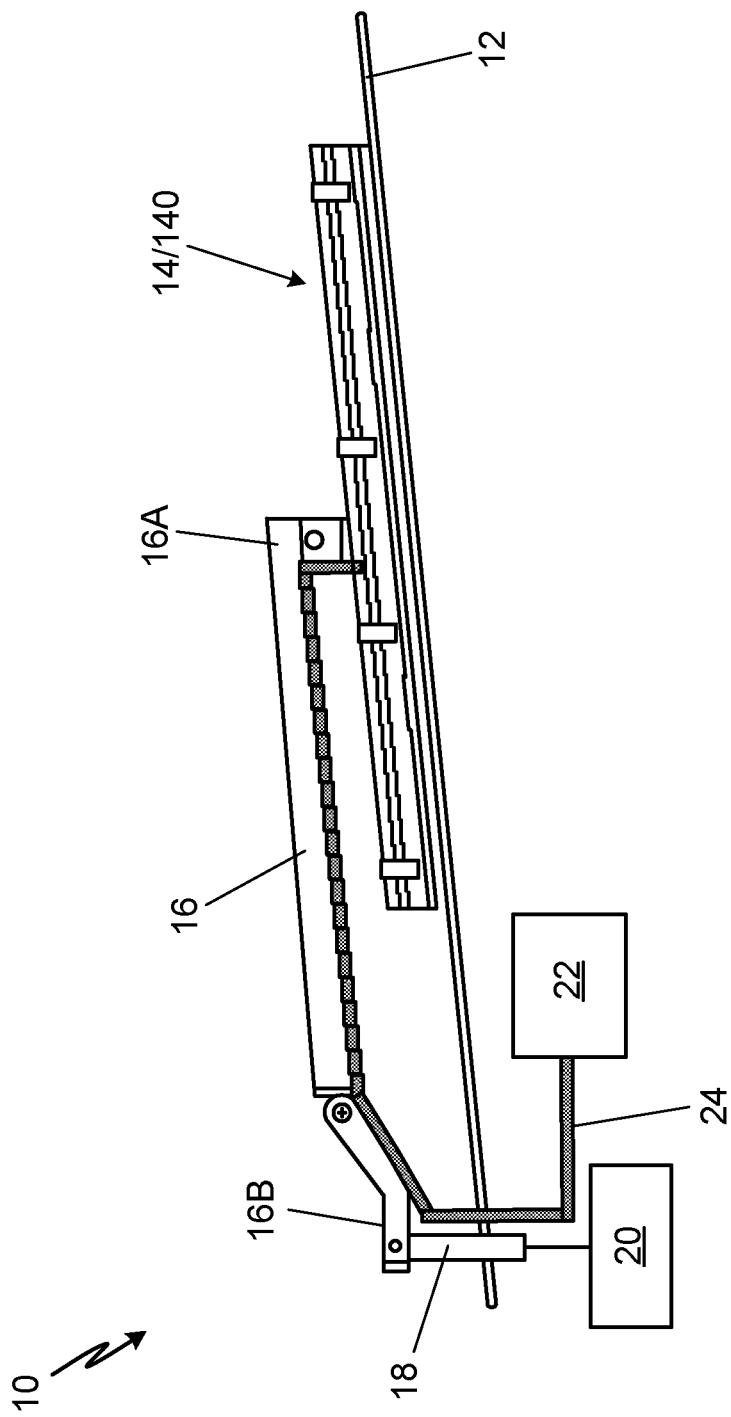
FIG. 1A is a side view of a windshield wiper system on an aircraft windshield.
Figure 1B:
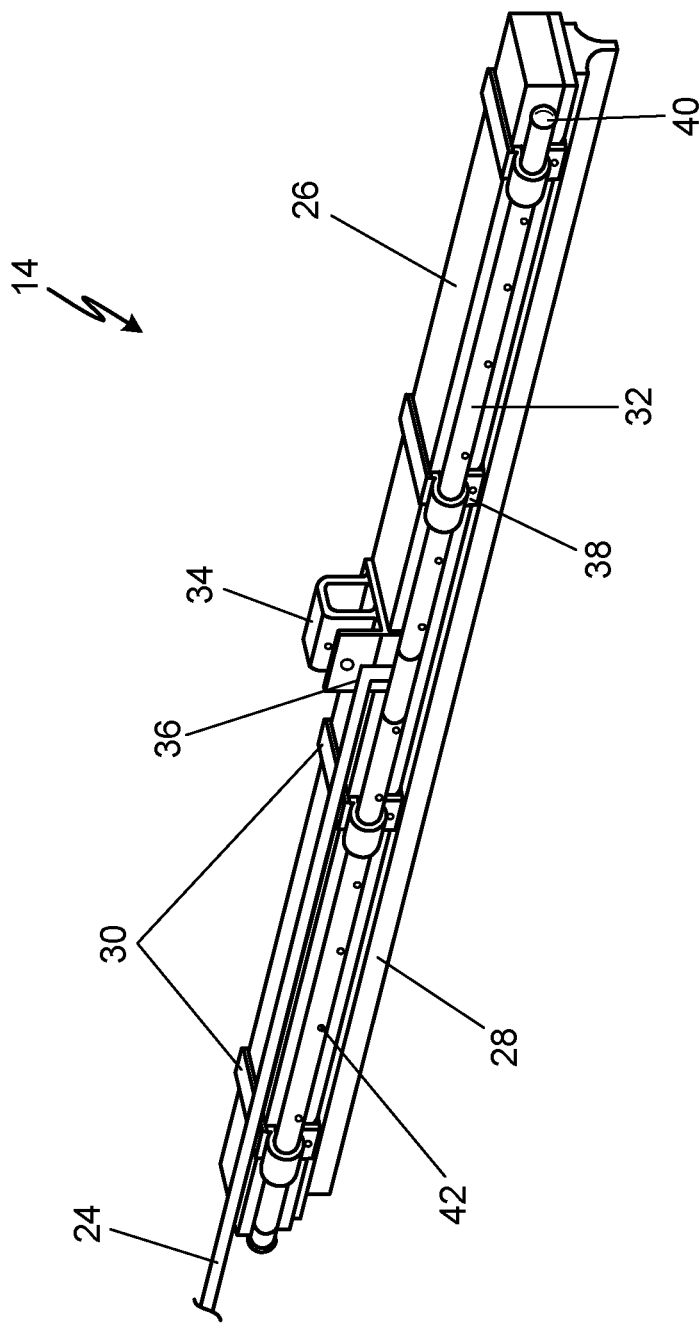
FIG. 1B is a perspective view of a wiper blade of the windshield wiper system.

FIG. 1A is a side view of windshield wiper system 10 on aircraft windshield 12. FIG. 1B is a perspective view of wiper blade 14 of windshield wiper system 10. FIGS. 1A-1B will be discussed together. Further, hereinafter windshield wiper system 10 will be referred to as WWS 10. WWS 10 includes wiper blade 14, wiper arm 16, output shaft 18, actuator 20, fluid source 22, and fluid line 24. WWS 10 is installed on an aircraft and WWS 10 is configured to clear windshield 12 of rain or other debris. Wiper arm 16 includes first end 16A positioned at a distal end of wiper arm 16 and second end 16B positioned at an opposite distal end of wiper arm 16 as first end 16A. Wiper blade 14 is coupled to first end 16A of wiper arm 16 through a coupler, discussed further below. Wiper arm 16 can be constructed from a polymer, a composite, a metal, or at least partially from one or more of the listed materials.

Wiper arm 16 is coupled to output shaft 18 at second end 16B of wiper arm 16 through a mechanical connection, such as a threaded or clamping connection. Output shaft 18 extends through a body portion of the aircraft adjacent windshield 12 but not through windshield 12. Output shaft 18 is configured to rotate about its central axis, providing rotational energy to second end 16B of wiper arm 16, which in turn forces wiper arm 16 and wiper blade 14 to traverse across windshield 12 in a sweeping motion. Actuator 20 is coupled to output shaft 18 within the body portion of the aircraft. Actuator 20 is configured to provide rotational energy to output shaft 18, rotating output shaft 18 about its central axis. The rotation of output shaft 18 forces wiper arm 16 and wiper blade 14 to traverse across windshield 12 in a sweeping motion, therefore actuator 20 provides the energy necessary to drive motion of WWS 10. In the embodiment shown, actuator 20 is a brushless direct current motor. In another embodiment, actuator 20 can be a brushed direct current motor or any other motor configured to provide rotational energy to output shaft 18. Further, actuator 20 is a bi-directional motor that can operate in both directions, allowing output shaft 18, wiper arm 16, and wiper blade 14 to travel across windshield 12 in both directions.

In one example, fluid source 22 can be an impermeable vessel of any shape, size, and material that is configured to store the fluid that will be dispensed onto windshield 12. In other words, fluid source 22 can be a leak proof container that includes a hollow interior configured to store fluids before the fluids are used by WWS 10. In other examples, fluid source 22 can be a flow path from a portion of an engine, compressor, auxiliary power unit, or any other hot air source within the aircraft, such as for example to provide engine bleed air to WWS 10. Fluid source 22 is positioned within the aircraft body and fluidly coupled to wiper blade 14 through fluid line 24, discussed further below. Fluid line 24 extends from fluid source 22 to wiper blade 14. Fluid line 24 can be a tube, channel, hose, or any other component capable of transferring a fluid from fluid source 22 to wiper blade 14. The fluid transferring through fluid line 24 can be one or more of water, windshield cleaning fluid, chemical rain repellant, and hot engine bleed air, among other options. Fluid line 24 is configured to provide a flow path for fluid to flow from fluid source 22 to wiper blade 14, allowing the fluid to dispense onto windshield 12 adjacent wiper blade 14. In the embodiment shown, fluid line 24 is coupled to wiper blade 14 at approximately the center of wiper blade 14, with respect to the length of wiper blade 14. In another embodiment, fluid line 24 can be coupled to wiper blade 14 at any location along the length of wiper blade 14.

Referring to FIG. 1B, wiper blade 14 includes support member 26, blade element 28, clips 30, wash tube 32, coupler 34, center support 36, and fastener 38. Support member 26 is coupled to blade element 28 and clip 30 is coupled to and surrounds at least a portion of support member 26 and at least a portion of blade element 28. Likewise, coupler 34 is coupled to and surrounds at least a portion of support member 26 and at least a portion of blade element 28. Fastener 38 extends through blade element 28 and clip 30, securing clip 30 to blade element 28. Each respective component will be discussed further below.

Support member 26 is a structural component that provides rigidity to wiper blade 14 during operation of WWS 10. In the embodiment shown, support member 26 includes a rectangular cross-section extending the length of wiper blade 14, providing stiffness and rigidity to wiper blade 14 to prevent undesirable deflection of wiper blade 14 in the sweeping directions. In another embodiment, support member 26 can include a cross-section of any shape that extends a full or partial length of wiper blade 14. Support member 26 can be constructed from a composite material, metallic material, or polymer material. In one example, support member 26 can be constructed from a carbon fiber reinforced polymer. Support member 26 is coupled to blade element 28 through an adhesive positioned between support member 26 and blade element 28 and extending a substantial length of support member 26. In one example, the adhesive used to couple support member 26 to blade element 28 is a polyurethane adhesive.

Blade element 28 is the component of wiper blade 26 that is configured to interface with windshield 12 to clear windshield 12 of water or other debris. Blade element 28 has a complex cross-sectional shape including a rectangular top portion and a generally triangular bottom portion configured to contact and clean windshield 12 on the aircraft. Blade element 28 can be constructed from a rubber material, such as in one example blade element 28 is constructed from a nitrile rubber. In some examples, blade element 28 can have a length that is less than a length of support member 26. During the adhesion of support member 26 to blade element 28, blade element 28 is stretched which causes support member 26 to flex into a curved configuration, conforming to the shape of windshield 12. In other examples, blade element 28 can have the same length as support member 26.

Clip 30 is a component of wiper blade 14 that is configured to provide additional attachment support between support member 26 and blade element 28. More specifically, clip 30 is coupled to both support member 26 and blade element 28, and clip 30 surrounds at least a portion of each of support member 26 and blade element 28. Clip 30 is configured to exert a clamping force on support member 26 and blade element 28, compressing support member 26 and blade element 28 together. Clip 30 can be constructed from a metal, a polymer, or a composite material. In one example, clip 30 can be constructed from a spring steel or sheet metal to facilitate the clamping force exerted on support member 26 and blade element 28. In the embodiment shown in FIG. 1B, wiper blade 14 includes four clips 30 coupled to support member 26 and blade element 28. In another example, wiper blade 14 can include more or less than four clips 30 coupled to support member 26 and blade element 28. The number of clips 30 coupled to wiper blade 14 depends on various factors, such as the length of wiper blade 14 and the forces exerted on wiper blade 14, among other factors. In one example, wiper blade 14 includes two inner clips 30 spaced equidistance from coupler 34 and two outer clips 30 adjacent the ends of wiper blade 26 that are also spaced equidistance from coupler 34. Further, in the example shown, there are an equal number of clips 30 positioned on each side of center support 36. In another example, there can be an unequal number of clips 30 positioned on each side of center support 36.

Coupler 34 is positioned at a center position with respect to a length of support member 26 and coupler 34 extends outward from support member 26 in a direction opposite of blade element 28. Similar to clip 30, coupler 34 is coupled to and surrounds at least a portion of support member 26 and at least a portion of blade element 28. Coupler 34 is configured to couple to support member 26 and blade element 28 at one end and couple to first end 16A of wiper arm 16 at the other end. As such, coupler 34 is configured to secure wiper blade 14 to wiper arm 16 of WWS 10. Coupler 34 can be coupled to wiper arm 16 through one or more of a rivet, bolt and nut, pin and clevis, and pin and clamp, among other options. In the embodiment shown, coupler 34 is constructed from a metallic material. In other embodiments, coupler 34 can be constructed from a polymer or a composite material, among other options.

Center support 36 is positioned adjacent and coupled to coupler 34. More specifically, center support 36 is positioned at a center position with respect to a length of support member 26 and center support 36 is coupled to coupler 34 through a weld or brazed joint. As such, in the embodiment shown, center support 36 is constructed from a metallic material, such as for example a stainless steel. In other embodiments, center support 36 can be constructed from a polymer or a composite material, among other options. Center support 36 is also coupled to wash tube 32 and center support 36 is configured to secure wash tube 32 to wiper blade 14 as well as provide additional support to wash tube 32. In the embodiment shown, center support 36 is coupled to wash tube 32 through a weld or brazed joint. In another embodiment, center support 36 can be coupled to wash tube 32 through a fastener, clamp, or adhesive, among other options.

As discussed, wash tube 32 is coupled to center support 36, securing wash tube 32 to wiper blade 14. Further, wash tube 32 is positioned adjacent support member 26 and coupled to support member 26 of wiper blade 14 through clips 30, such that wash tube 32 is integral with support member 26. In the context of the present application, "integral" means forming a part of the same assembly. Using this definition, wash tube 32 is integral with support member 26 because wash tube 32 is coupled to support member 26 using clips 30. As such, wash tube 32 is part of the assembly shown as wiper blade 14. Wash tube 32 is secured to wiper blade 14 adjacent the initial sweep side of wiper blade 14. In other words, if wiper blade 14 initially sweeps in a left direction when activated, wash tube 32 is also positioned on the left side of wiper blade 14. Likewise, if wiper blade 14 initially sweeps in a right direction when activated, wash tube 32 is also positioned on the right side of wiper blade 14. Wash tube 32 is a tubular component that includes a hollow center portion, allowing fluids to flow through the center of wash tube 32. In the embodiment shown, wash tube 32 has a circular cross-sectional shape when viewing in the axial direction of wash tube 32. In other embodiments, wash tube 32 can have any desired cross-sectional shape when viewing in the axial direction of wash tube 32. Further, in the embodiment shown, wash tube 32 is constructed from a metallic material, such as for example stainless steel, allowing wash tube 32 to be coupled to center support 36 through a weld or brazed joint. In other embodiments, wash tube 32 can be constructed from a polymer or a composite material, among other options.

Wash tube 32 includes end caps 40 positioned at each distal end of wash tube 32, preventing fluid from flowing out through each distal end of wash tube 32. End caps 40 can be coupled to wash tube 32 through one or more of a friction fit, an adhesive, and a weld or brazed joint, among other fluid tight options. In the embodiment shown, end caps 40 have an outer diameter that is larger than the outer diameter of wash tube 32, which aids in preventing wash tube 32 from translating and sliding out from the outermost clips 30 secured to wiper blade 14. In other embodiments, the outer diameter of end caps 40 may not be larger than the outer diameter of wash tube 32. In the embodiment shown, end caps 40 have a circular cross-sectional shape when viewing in the axial direction of end caps 40. In other embodiments, end caps 40 can have any desired cross-sectional shape that conforms to the outer shape of wash tube 32. Further, in the embodiment shown, end caps 40 are constructed from a metallic material, such as for example stainless steel, allowing end caps 40 to be coupled to wash tube 32 through a weld or brazed joint. In other embodiments, end caps 40 can be constructed from a polymer or a composite material, among other options.

Wash tube 32 also includes a plurality of nozzles 42 extending through wash tube 32, providing a location in which the fluid flowing through the hollow center portion of wash tube 32 can dispense or exit wash tube 32 onto windshield 12 of the aircraft. In some examples, each nozzle 42 can be an aperture extending through an outer wall of wash tube 32. Nozzles 42 are configured to increase the pressure and velocity of the fluid as the fluid dispenses through nozzles 42 of wash tube 32. In the embodiment shown, wash tube 32 includes twelve nozzles 42 spaced along a length of wash tube 32. In another embodiment, wash tube 32 can include more or fewer than twelve nozzles 42 spaced along the length of wash tube 32. The number of nozzles 42 will vary depending on the length of wiper blade 14 and the fluid requirements for each specific application. As such, wash tube 32 receives a fluid from fluid line 24 fluidly coupled to wash tube 32, the fluid flows into the center hollow portion of wash tube 32, and then the fluid dispenses through the plurality of nozzles 42 onto windshield 12 of the aircraft.

Figure 2A:
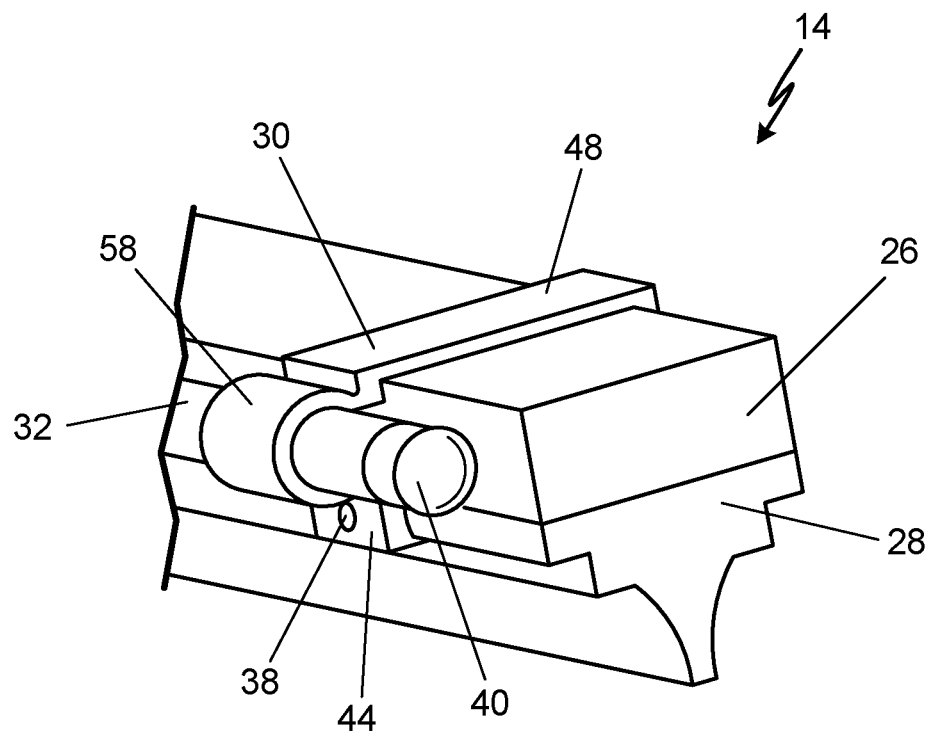
FIG. 2A is a close-up perspective view of an end portion of the wiper blade of FIG. 1B.
Figure 2B:
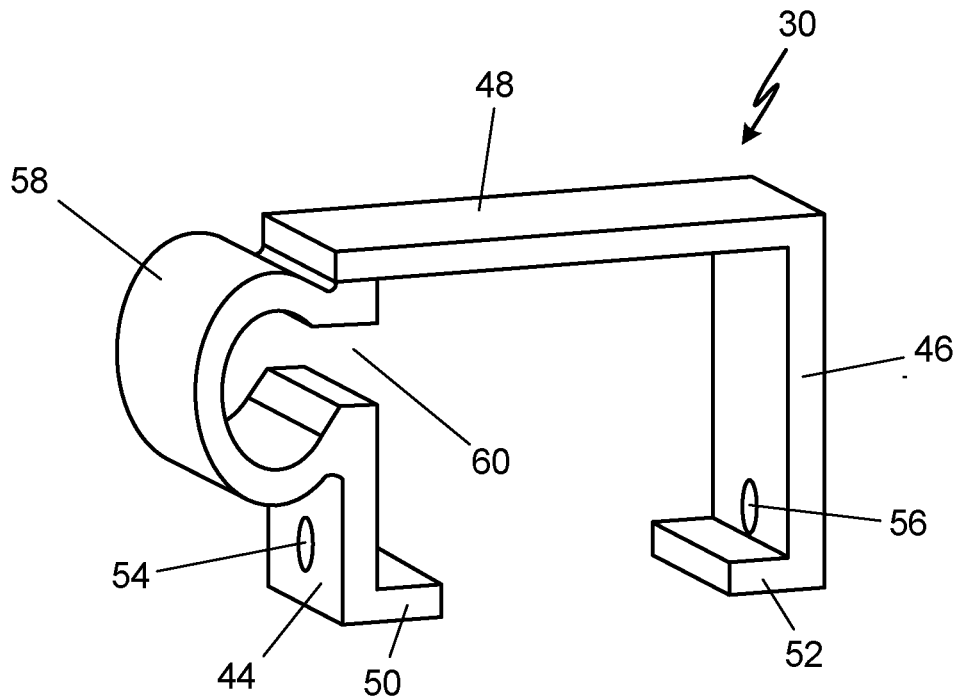
FIG. 2B is a perspective view of a clip of the wiper blade of FIG. 1B.
Figure 2C:
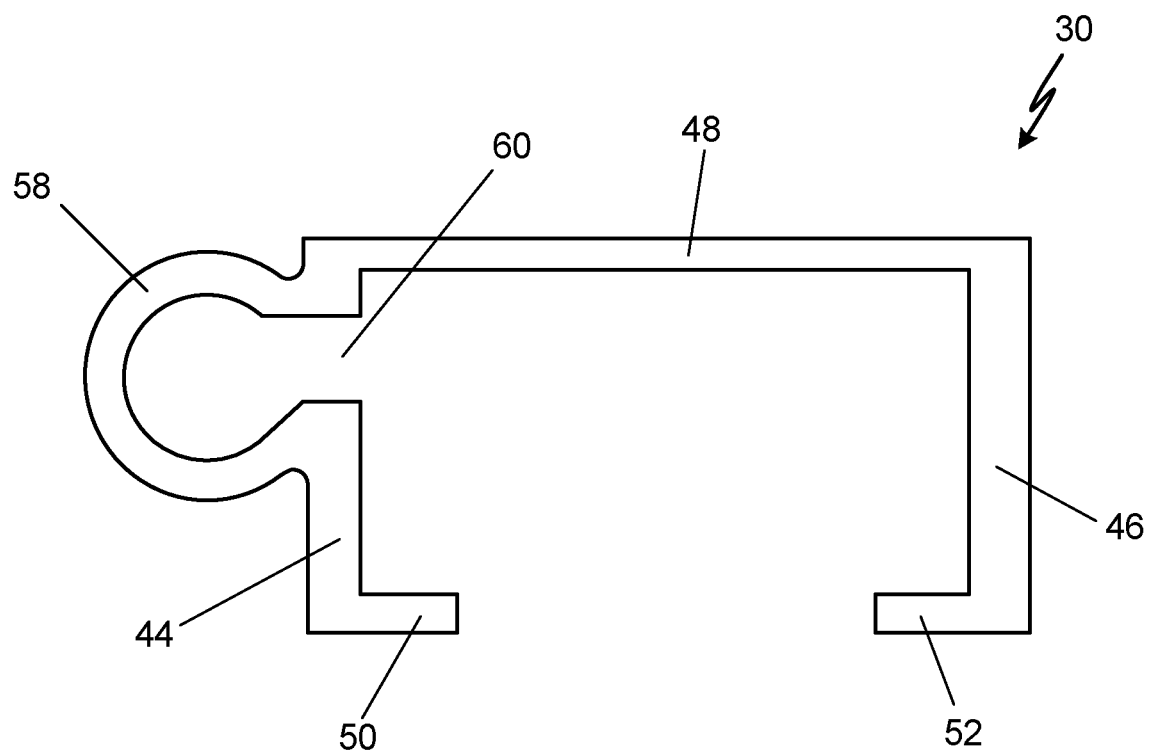
FIG. 2C is a front view of the clip of the wiper blade of FIG. 1B.

FIG. 2A is a close-up perspective view of an end portion of wiper blade 14. FIG. 2B is a perspective view of clip 30 of wiper blade 14. FIG. 2C is a front view of clip 30 of wiper blade 14. FIGS. 2A-2C will be discussed together. Clip 30 includes first side 44, second side 46, top 48, first extension 50, second extension 52, first aperture 54, second aperture 56, and clamp 58. Clip 30 is a component of wiper blade 14 configured to secure other components of wiper blade 14 together. More specifically, clip 30 secures support member 26 and blade element 28 together through a compressive force exerted by clip 30. In addition, clip 30 secures and couples wash tube 32 to wiper blade 14 adjacent support member 26 during operation of WWS 10, discussed below. Clip 30 can be constructed from a composite material, metallic material, or polymer-based material. In the embodiment shown, clip 30 is constructed from a metallic material, such as for example sheet metal, and formed using various bending operations. In other embodiments, clip 30 can be manufactured using other methods, such as for example additive manufacturing and machining operations, among other options.

First side 44 is a side portion/wall of clip 30, and second side 46 is a side portion/wall of clip 30 that is oriented offset from and parallel to first side 44. Top 48 extends perpendicular to first side 44 and second side 46. Further, top 48 extends between and connects first side 44 and second side 46. First extension 50 extends inward from first side 44 toward a center portion of clip 30. First extension 50 extends inward only a partial distance and does not connect to second side 46, leaving a gap or opening for a portion of blade element 28 to extend through. First extension 50 is oriented parallel to top 48 and perpendicular to first side 44. Second extension 52 extends inward from second side 46 toward a center portion of clip 30. Second extension 52 extends inward only a partial distance and does not connect to first side 44, leaving a gap or opening for a portion of blade element 28 to extend through. Second extension 52 is oriented parallel to top 48 and perpendicular to second side 46. When clip 30 is installed on and secured to support member 26 and blade element 28 of wiper blade 14, first extension 50 and second extension 52 engage a portion of blade element 28 to produce the compressive force on support member 26 and blade element 28.

First aperture 54 extends through first side 44 of clip 30 and second aperture 56 extends through second side 46 of clip 30. First aperture 54 and second aperture 56 can be a hole that extends fully through first side 44 and second side 46, respectively, such that a central axis of first aperture 54 is axially aligned with a central axis of second aperture 56. First aperture 54 and second aperture 56 are configured to provide a location to couple clips 30 to blade element 28. Clips 30 are installed on wiper blade 14 by inserting clips 30 over the distal ends of wiper blade 14 and then positioning clips 30 at the desired location on wiper blade 14. More specifically, clips 30 are slid down support member 26 and blade element 28 until first aperture 54 and second aperture 56 of clip 30 are aligned with a desired one of the plurality of blade element apertures spaced along the length and extending through blade element 28. Once first aperture 54 and second aperture 56 are aligned with the desired aperture on blade element 28, fastener 38 is inserted through each of the apertures and secures clip 30 to blade element 28. Fastener 38 can extend through each clip 30 coupled to support member 26 and blade element 28. As such, in an embodiment including four clips 30, there will be four fasteners 38 securing the four clips 30 to support member 26 and blade element 28. The number of fasteners 38 will depend on the number of clips 30 on wiper blade 14. Fastener 38 can be a rivet, bolt and nut, pin and clevis, pin and clamp, among other options.

Fastener 38 is configured to extend through only clip 30 and the rectangular top portion of blade element 28 to secure clip 30 to blade element 28, which further secures support member 26 and blade element 28 together in compression. Fastener 38 does not extend through support member 26 in an effort to eliminate apertures within support member 26. Any apertures extending through support member 26 could reduce the rigidity and stiffness of support member 26, limiting the usefulness of support member 26 during operation of WWS 10. A support member 26 including apertures could result in increased deflection of wiper blade 14 during operation of WWS 10, as compared to a wiper blade 14 without apertures extending through support member 26. Increased deflection of wiper blade 14 could result in damage to wiper blade 14 and/or a nonconforming WWS 10 based on unsatisfactory sweep angle limits. As such, it is advantageous for WWS 10 to avoid or eliminate apertures extending through support member 26 to reduce deflection of wiper blade 14 during operation of WWS 10.

Clip 30 includes clamp 58 extending outward from first side 44 of clip 30. Clamp 58 is the feature of clip 30 that is configured to couple wash tube 32 to clip 30 and the overall wiper blade 14. In the embodiment shown, clamp 58 has a generally circular cross-section to conform to the circular cross-section of wash tube 32. In another embodiment, clamp 58 can have any cross-sectional shape that conforms with the cross-sectional shape of wash tube 32. Referring to the embodiment shown, clamp 58 has an inner diameter that is approximately equal to an outer diameter of wash tube 32, allowing clamp 58 to secure and hold wash tube 32 in place during operation of WWS 10. Clamp 58 further includes entry 60, which extends through first side 44 of clip 30. Entry 60 of clamp 58 is configured to provide a location in which wash tube 32 is inserted into clamp 58. As shown in FIG. 2C, entry 60 is an opening that allows wash tube 32 to snap fit into clamp 58. The height of the opening of entry 60, parallel to first side 44, is less than the outer diameter of wash tube 32, requiring wash tube 32 to be forced through entry 60 to be seated within clamp 58. Entry 60 being less than the outer diameter of wash tube 32 secures wash tube 32 within clamp 58 and prevents wash tube 32 from falling out of clamp 58 during operation of WWS 10.

Previous windshield wiper systems utilizing metallic supports have a wash tube welded or brazed to the metallic components for providing fluid adjacent the wiper blade sweeping across the windshield. Windshield wiper systems utilizing composite supports cannot include welded or brazed fluid tubes along the entire length of the wiper blade and therefore there is a need for a solution to coupling fluid tubes to composite supports of wiper blade assemblies. Clips 30 and center support 36 provide a solution for coupling wash tube 32 to composite support member 26. Clips 30 secure support member 26 and blade element 28 together and also hold and secure wash tube 32 to support member 26 of wiper blade 14, without welding or brazing operations. As such, WWS 10 including clips 30 and center support 36 allow a windshield washing system including wash tube 32 to be utilized on aircrafts with composite support members 26. Therefore, the aircraft windshield washing system benefits from the decreased over-sweep and under-sweep by utilizing the composite support member 26 and also benefits from the capability to dispense a fluid onto windshield 12 of the aircraft to aid in cleaning windshield 12 to improve visibility for both the pilot and copilot operating the aircraft.

Figure 3A:
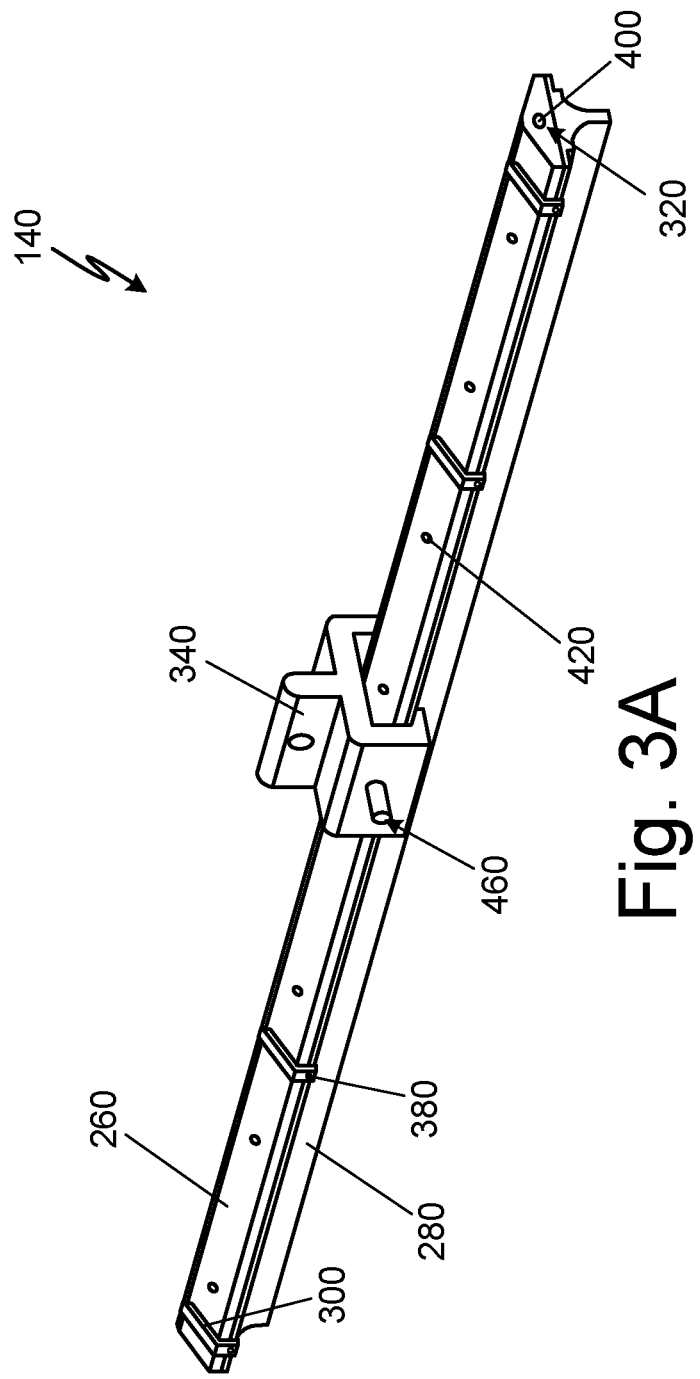
FIG. 3A is a perspective view of another example wiper blade of the windshield wiper system.
Figure 3B:
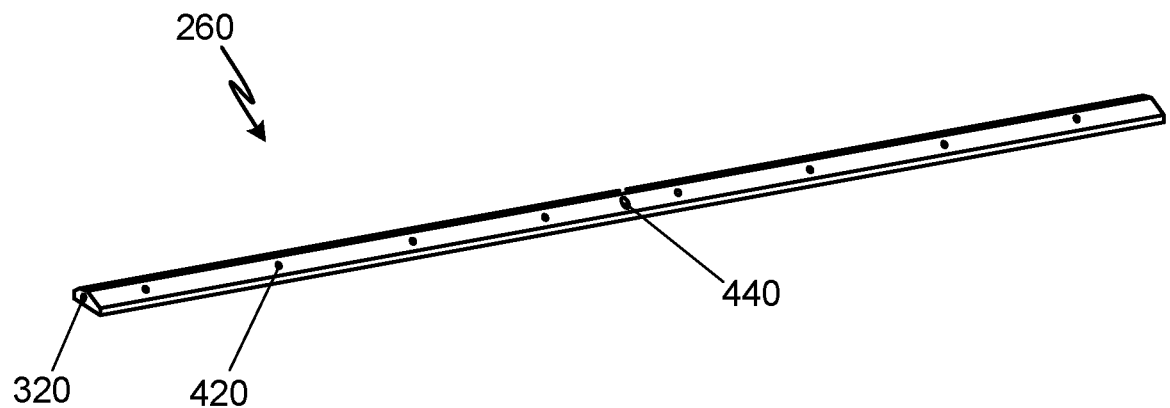
FIG. 3B is a perspective view of the composite support of the example wiper blade of FIG. 3A.
Figure 3C:
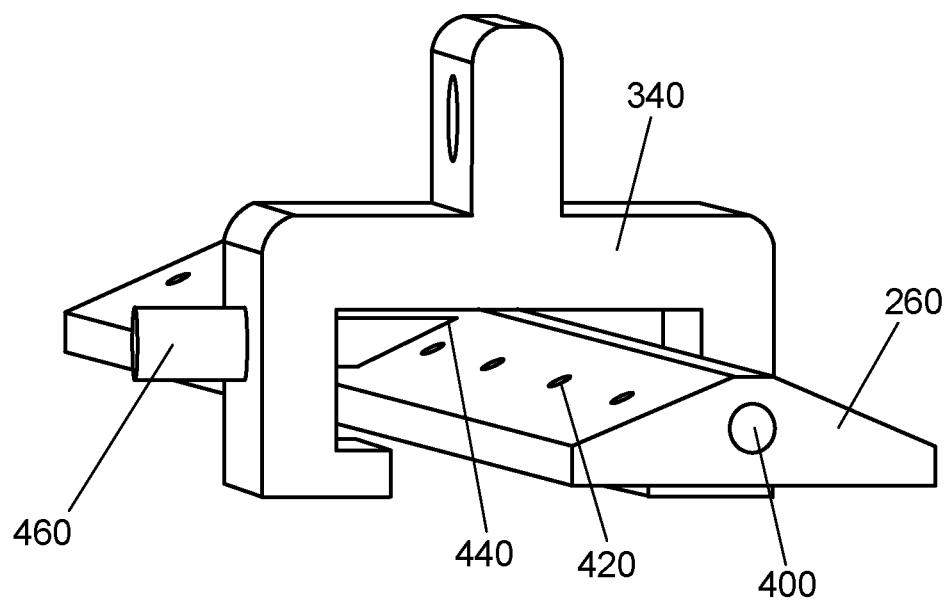
FIG. 3C is a close-up perspective view of the example wiper blade of FIG. 3A.

FIG. 3A is a perspective view of an example wiper blade 140 of windshield wiper system 10. FIG. 3B is a perspective view of the composite support member 260 of wiper blade 140. FIG. 3C is a close-up perspective view of wiper blade 140 with blade element 280 removed for clarity. FIGS. 3A-3C will be discussed together. Referring to FIG. 3A, wiper blade 140 includes support member 260, blade element 280, clips 300, wash tube 320, coupler 340, and fastener 380. Support member 260 is coupled to blade element 280 and clip 300 is coupled to and surrounds at least a portion of support member 260 and at least a portion of blade element 280. Likewise, coupler 340 is coupled to and surrounds at least a portion of support member 260 and at least a portion of blade element 280. Fastener 380 extends through blade element 280 and clip 300, securing clip 300 to blade element 280. Each respective component will be discussed further below.

Support member 260 is a structural component that provides rigidity to wiper blade 140 during operation of WWS 10. In the embodiment shown, support member 260 includes a generally triangular cross-section extending the length of wiper blade 140, providing stiffness and rigidity to wiper blade 140 to prevent undesirable deflection of wiper blade 140 in the sweeping directions. In another embodiment, support member 260 can include a cross-section of any shape that extends a full or partial length of wiper blade 140. Support member 260 can be constructed from a composite material, metallic material, or polymer material. In one example, support member 260 can be constructed from a carbon fiber reinforced polymer. Support member 260 is coupled to blade element 280 through an adhesive positioned between support member 260 and blade element 280 and extending a substantial length of support member 260. In one example, the adhesive used to couple support member 260 to blade element 280 is a polyurethane adhesive.

Blade element 280 is the component of wiper blade 260 that is configured to interface with windshield 12 to clear windshield 12 of water or other debris. Blade element 280 has a complex cross-sectional shape including a rectangular top portion and a generally triangular bottom portion configured to contact and clean windshield 12 on the aircraft. Blade element 280 can be constructed from a rubber material, such as in one example blade element 280 is constructed from a nitrile rubber. In some examples, blade element 280 can have a length that is less than a length of support member 260. During the adhesion of support member 260 to blade element 280, blade element 280 is stretched which causes support member 260 to flex into a curved configuration, conforming to the shape of windshield 12. In other examples, blade element 280 can have the same length as support member 260.

Clip 300 is a component of wiper blade 140 that is configured to provide additional attachment support between support member 260 and blade element 280. More specifically, clip 300 is coupled to both support member 260 and blade element 280, and clip 300 surrounds at least a portion of each of support member 260 and blade element 280. Clip 300 is configured to exert a clamping force on support member 260 and blade element 280, compressing support member 260 and blade element 280 together. Fastener 380 is configured to extend through only clip 300 and the rectangular top portion of blade element 280 to secure clip 300 to blade element 280, which further secures support member 260 and blade element 280 together in compression. Fastener 380 does not extend through support member 260 in an effort to eliminate unnecessary apertures within support member 260. Fastener 380 can extend through each clip 300 coupled to support member 260 and blade element 280. As such, in an embodiment including four clips 300, there will be four fasteners 380 securing the four clips 300 to support member 260 and blade element 280. The number of fasteners 380 will depend on the number of clips 300 on wiper blade 140. Fastener 380 can be a rivet, bolt and nut, pin and clevis, pin and clamp, among other options.

Clip 300 can be constructed from a metal, a polymer, or a composite material. In one example, clip 300 can be constructed from a spring steel or sheet metal to facilitate the clamping force exerted on support member 260 and blade element 280. In the embodiment shown in FIG. 3A, wiper blade 140 includes four clips 300 coupled to support member 260 and blade element 280. In another example, wiper blade 140 can include more or less than four clips 300 coupled to support member 260 and blade element 280. The number of clips 300 coupled to wiper blade 140 depends on various factors, such as the length of wiper blade 140 and the forces exerted on wiper blade 140, among other factors. In one example, wiper blade 140 includes two inner clips 300 spaced equidistance from coupler 340 and two outer clips 300 adjacent the ends of wiper blade 260 that are also spaced equidistance from coupler 340. Further, in the example shown, there are an equal number of clips 300 positioned on each side of center support 360. In another example, there can be an unequal number of clips 300 positioned on each side of center support 360.

Coupler 340 is positioned at a center position with respect to a length of support member 260 and coupler 340 extends outward from support member 260 in a direction opposite of blade element 280. Similar to clip 300, coupler 340 is coupled to and surrounds at least a portion of support member 260 and at least a portion of blade element 280. Coupler 340 is configured to couple to support member 260 and blade element 280 at one end and couple to first end 16A of wiper arm 16 at the other end. As such, coupler 340 is configured to secure wiper blade 140 to wiper arm 16 of WWS 10 (FIG. 1A). Coupler 340 can be coupled to wiper arm 16 through one or more of a rivet, bolt and nut, pin and clevis, and pin and clamp, among other options. In the embodiment shown, coupler 340 is constructed from a metallic material. In other embodiments, coupler 340 can be constructed from a polymer or a composite material, among other options.

As shown best in FIG. 3B, wash tube 320 is an aperture that extends fully through support member 260, from one end of support member 260 to the other end of support member 260. As such, wash tube 320 is integral with and positioned within support member 260. Using the definition of "integral" provided above, wash tube 320 is integral with support member 260 because wash tube 320 is positioned within support member 260. As such, wash tube 320 is part of the assembly shown as wiper blade 140. Wash tube 320 is a tubular feature through a center portion of support member 260 that allows fluids to flow through wash tube 320 within support member 260. In the embodiment shown, wash tube 320 has a circular cross-sectional shape when viewing in the axial direction of wash tube 320. In other embodiments, wash tube 320 can have any desired cross-sectional shape when viewing in the axial direction of wash tube 320. Referring to FIG. 3A, wiper blade 140 also includes plugs 400 positioned at each distal end of wash tube 320. More specifically, plugs 400 are inserted within the ends of wash tube 320 and plugs 400 prevent fluid from flowing out through each distal end of wash tube 320. Plugs 400 can be coupled to wash tube 320 through one or more of a friction fit, an adhesive, and a composite fusion process, among other fluid tight options. In the embodiment shown, end caps 400 have an outer diameter that is smaller than the outer diameter of wash tube 320, which allows plugs 400 to be inserted within wash tube 320. In the embodiment shown, end caps 400 have a circular cross-sectional shape when viewing in the axial direction of end caps 400. In other embodiments, end caps 400 can have any desired cross-sectional shape that conforms to the outer shape of wash tube 320. Further, end caps 400 can be constructed from the same or similar composite material as support member 260.

Wiper blade 140 also includes a plurality of nozzles 420 and fluid input 440 (FIG. 3B). Nozzles 420 extend through support member 260, providing a location in which the fluid flowing through wash tube 320 can dispense or exit wash tube 320 onto windshield 12 of the aircraft. In some examples, each nozzle 420 can be an aperture extending through support member 260. Nozzles 420 are configured to increase the pressure and velocity of the fluid as the fluid dispenses through nozzles 420. In the embodiment shown, support member 260 includes eight nozzles 420 spaced along a length of support member 260. In another embodiment, support member 260 can include more or fewer than eight nozzles 420 spaced along the length of support member 260. The number of nozzles 420 will vary depending on the length of wiper blade 140 and the fluid requirements for each specific application. Further, nozzles 420 are positioned adjacent the initial sweep side of wiper blade 140. In other words, if wiper blade 140 initially sweeps in a left direction when activated, nozzles 420 are also positioned on the left side of wiper blade 140. Likewise, if wiper blade 140 initially sweeps in a right direction when activated, nozzles 420 are also positioned on the right side of wiper blade 140. Positioning nozzles 420 on the initial sweep side of wiper blade 140 allows fluid to dispense onto windshield 12 in front of wiper blade 140 before wiper blade 140 sweeps across an area of windshield 12.

Referring to FIG. 3B, fluid input 440 is an aperture that extends through support member 260 and connects to wash tube 320. Fluid input 440 is positioned at approximately the center of support member 260 in the lengthwise direction of support member 260. Fluid input 440 fluidly connects fluid line 24 (FIG. 1A) and wash tube 320, providing a flow path for fluid to flow from fluid line 24 into wash tube 320. More specifically, referring to FIG. 3C, fluid flows from fluid line 24 into input port 460, and then the fluid flows from input port 460 into fluid input 440 of support member 260. Input port 460 is a tube, channel, or the like, that extends through and is coupled to coupler 340. More specifically, input port 460 extends through an aperture within coupler 340 and input port 460 is coupled to coupler 340 through a braze or weld connection. As such, input port 460 and coupler 340 can be constructed from a metallic material, facilitating the brazing or welded connection between the components. Further, the end of input port 460 extending within fluid input 440 of support member 260 is coupled to support member 260 through an adhesive connection. Brazing or welding input port 460 to coupler 340 and coupling input port 460 to support member 260 through an adhesive provides additional support and connection between support member 260 and coupler 340. Input port 460 provides a connection and flow path between fluid line 24 and fluid input 440, allowing fluid to flow from fluid input 24 through input port 460 and into fluid input 440. As such, in operation fluid is transferred from fluid source 22 through fluid line 24, the fluid travels through fluid line 24 to input port 460, the fluid flows through input port 460 and into fluid input 440, the fluid flows through fluid input 440 and into wash tube 320, and then the fluid flows through wash tube 320 and dispenses through the plurality of nozzles 420 onto windshield 12 of the aircraft.

Previous windshield wiper systems utilizing metallic supports have a wash tube welded or brazed to the metallic components for providing fluid adjacent the wiper blade sweeping across the windshield. Windshield wiper systems utilizing composite supports cannot include welded or brazed fluid tubes along the entire length of the wiper blade and therefore there is a need for a solution to coupling fluid tubes to composite supports of wiper blade assemblies. As such, WWS 10 including wiper blade 140 allow a windshield washing system including wash tube 320 to be utilized on aircrafts with composite support members 260. Therefore, the aircraft windshield washing system benefits from the decreased over-sweep and under-sweep by utilizing the composite support member 260 and also benefits from the capability to dispense a fluid onto windshield 12 of the aircraft to aid in cleaning windshield 12 to improve visibility for both the pilot and copilot operating the aircraft.

Discussion of Possible Embodiments

The following are non-exclusive descriptions of possible embodiments of the present invention.

A wiper blade for use on a windshield of an aircraft, the wiper blade comprising: a support member coupled to a blade element, wherein the support member is constructed from a composite material; a clip coupled to and surrounding at least a portion of the support member and at least a portion of the blade element; and a wash tube integral with the support member, wherein the wash tube is fluidly coupled to a plurality of nozzles spaced along a length of the wiper blade.

The wiper blade of the preceding paragraph can optionally include, additionally and/or alternatively, any one or more of the following features, configurations and/or additional components:

The wash tube receives a fluid from a fluid line fluidly coupled to the wash tube, and wherein the wash tube dispenses the fluid through the plurality of nozzles onto the windshield of the aircraft.

A coupler coupled to and surrounding at least a portion of the support member and at least a portion of the blade element.

The wiper blade comprises a plurality of clips, and wherein an equal number of clips are positioned on each side of the coupler.

At least two clips are coupled to and surrounding at least a portion of the support member and at least a portion of the blade element, and wherein the at least two clips are spaced equidistant from the coupler.

A center support is positioned at a center location of the support member with respect to a length of the support member, and wherein the center support is coupled to the coupler, and wherein the center support is coupled to the wash tube through a weld or brazed joint.

The wash tube is positioned adjacent the support member and coupled to the clip.

The clip comprises a clamp extending outwards from a first side of the clip, and wherein the clamp couples the wash tube to the clip.

An inner diameter of the clamp is equal to an outer diameter of the wash tube; the clamp comprises an entry extending through the first side of the clip; and a height of the entry in a direction parallel to the first side is less than the outer diameter of the wash tube.

The wash tube includes end caps positioned at each distal end of the wash tube; the end caps are coupled to the wash tube through a weld or brazed joint; and a diameter of the end caps is larger than a diameter of the wash tube.

The clip comprises a first extension extending inward from a first side of the clip and a second extension extending inward from a second side of the clip; and the first extension is perpendicular to the first side and the second extension is perpendicular to the second side.

The first extension and the second extension engage the blade element when the clip is coupled to the blade element.

The clip comprises a first aperture extending through a first side of the clip and a second aperture extending through a second side of the clip; and wherein a central axis of the first aperture is axially aligned with a central axis of the second aperture.

A fastener extends through the first aperture, the second aperture, and a blade aperture extending through the blade element to secure the clip to the blade element.

The wash tube is an aperture that extends fully through the support member, from a first end of the support member to the second end of the support member.

A plug positioned at each distal end of the wash tube, wherein an outer diameter of the plugs are smaller than an outer diameter of the wash tube, and wherein the plugs are inserted into the distal ends of the wash tube.

The plurality of nozzles are apertures that extend through the support member, and wherein the plurality of nozzles are spaced along a length of the support member.

A fluid input extending into the support member and fluidly connecting to the wash tube within the support member.

The fluid input is an aperture that is positioned at approximately a center of the support member with respect to a length of the support member An input port axially aligned with and coupled to the fluid input of the support member, wherein the input port fluidly couples the fluid input of the support member to a fluid source.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A wiper blade for use on a windshield of an aircraft, the wiper blade comprising:
 a support member coupled to a blade element, wherein the support member is constructed from a composite material;
 a clip coupled to and surrounding at least a portion of the support member and at least a portion of the blade element; and
 a wash tube integral with the support member, wherein the wash tube is fluidly coupled to a plurality of nozzles spaced along a length of the wiper blade and wherein the wash tube is positioned adjacent the support member and coupled to the clip;
 wherein the clip comprises a clamp extending outwards from a first side of the clip, and wherein the clamp couples the wash tube to the clip;
 wherein the clip comprises a first aperture extending through a first side of the clip and a second aperture extending through a second side of the clip, wherein a central axis of the first aperture is axially aligned with a central axis of the second aperture; and
 wherein a fastener extends through the first aperture, the second aperture, and a blade aperture extending through the blade element to secure the clip to the blade element.

2. The wiper blade of claim 1, wherein the wash tube receives a fluid from a fluid line fluidly coupled to the wash tube, and wherein the wash tube dispenses the fluid through the plurality of nozzles onto the windshield of the aircraft.

3. The wiper blade of claim 1 and further comprising a coupler coupled to and surrounding at least a portion of the support member and at least a portion of the blade element.

4. The wiper blade of claim 3, wherein the wiper blade comprises a plurality of clips, and wherein an equal number of clips are positioned on each side of the coupler.

5. The wiper blade of claim 3, wherein at least two clips are coupled to and surrounding at least a portion of the support member and at least a portion of the blade element, and wherein the at least two clips are spaced equidistant from the coupler.

6. The wiper blade of claim 3, wherein a center support is positioned at a center location of the support member with respect to a length of the support member, and wherein the center support is coupled to the coupler, and wherein the center support is coupled to the wash tube through a weld or brazed joint.

7. The wiper blade of claim 1, wherein:
an inner diameter of the clamp is equal to an outer diameter of the wash tube;
the clamp comprises an entry extending through the first side of the clip; and
a height of the entry in a direction parallel to the first side is less than the outer diameter of the wash tube.

8. The wiper blade of claim 1, wherein:
the wash tube includes end caps positioned at each distal end of the wash tube;
the end caps are coupled to the wash tube through a weld or brazed joint; and
a diameter of the end caps is larger than a diameter of the wash tube.

9. The wiper blade of claim 1, wherein:
the clip comprises a first extension extending inward from a first side of the clip and a second extension extending inward from a second side of the clip; and
the first extension is perpendicular to the first side and the second extension is perpendicular to the second side.

10. The wiper blade of claim 9, wherein the first extension and the second extension engage the blade element when the clip is coupled to the blade element.

* * * * *